United States Patent Office 3,240,262
GAS AND LIQUID CONTACT HEAT EXCHANGER
Henry Nybölet, Major Andresens vei 2,
Sarpsborg, Norway
Filed Apr. 6, 1964, Ser. No. 357,378
1 Claim. (Cl. 165—60)

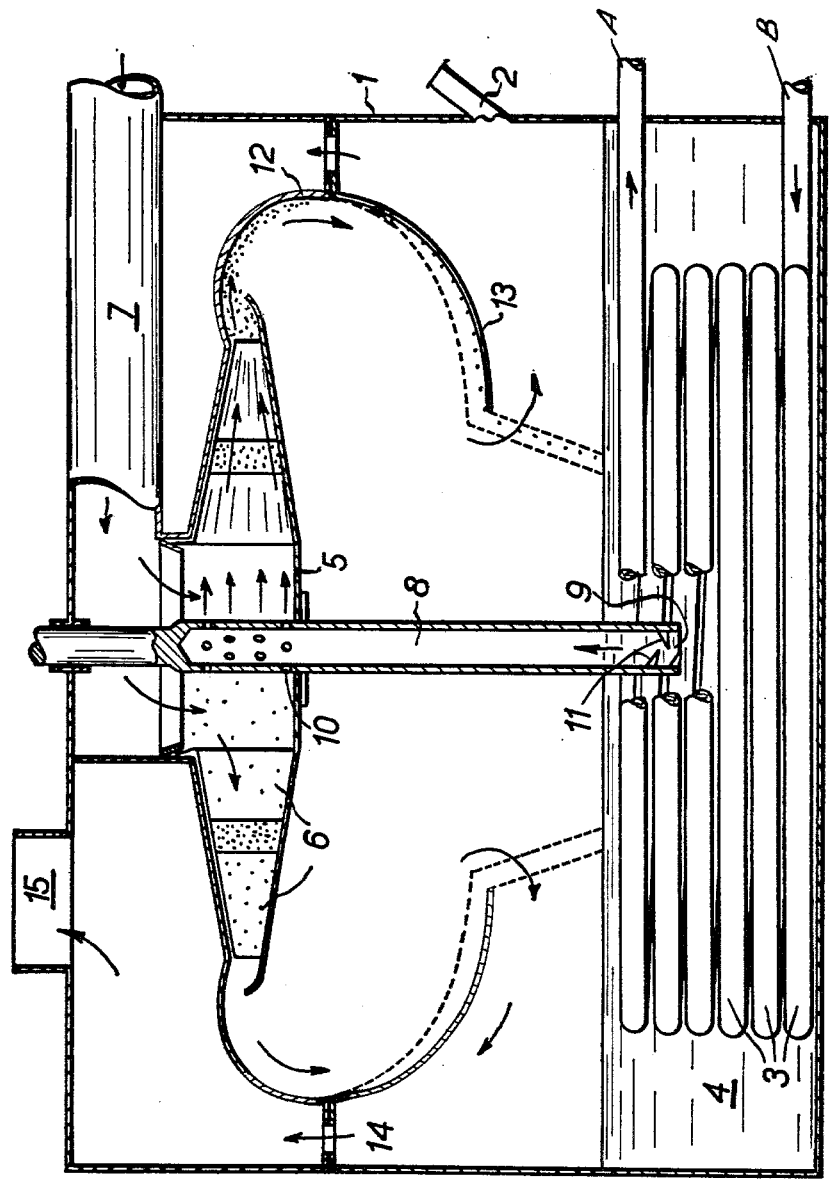

The present invention relates to a heat exchanger having a high heat transmission efficiency.

Hitherto used cooling methods usually consist in passing through a compressor plant an easily vaporizable liquid, e.g., ammonia or the like, said fluid being transferred from the compressor to a condenser, in which it becomes condensed to liquid condition, and from which it is transferred to an evaporator, which comprises a tube-system provided with fins, whereby said tube-system and its fins are cooled down to low temperatures due to the effect of evaporation of such liquid. Adjacent to said fin-system there is provided a fan, which is adapted to blow air through the fin-system and to forward the thus cooled air into the space that is to be cooled. In such a system the heat exchange may have a low efficiency, since the contact between the cooled fins and the air is not very effective, and since some air may also pass through the fin-system without coming into direct contact with the system.

In previous heating systems use has been made of hot coils through which the air to be heated is blown by means of a fan; in this case also there is the difficulty that some of the air will pass through the heating coils, without directly contacting the latter.

The object of the invention is to provide a heat exchanger in which cooling or heating, respectively, of the air takes place in such manner that the air is brought into intimate contact with cooled or heated fluid suitable for this purpose.

According to the invention this object is obtained by use of a rotor, which causes the respectively cooled or heated fluid to come into intimate contact with the air or other gas that is to be cooled or heated, respectively.

Thus the invention relates to a heat exchanger comprising a housing having an inlet and an outlet for the air or gas to be cooled or heated, respectively, where the lower portion of said housing may contain a tube coil for conducting a medium adapted to cool (or heat, respectively) the fluid, and is mainly characterised by the combination of the following features known per se, viz., that in the top portion of the housing there is arranged a rotor, which is closed on both sides and open at the rim. The rotor is provided with a central air intake and with an exterior closure, said exterior closure having blades and having a leading screen provided with returning blades. The rotor shaft contains a channel which is extended downwards to extend into a fluid contained within the lower portion of the housing, said channel at the level of the rotor blades being provided with outlet openings for the fluid. In or at the lower end of said channel of the rotor shaft there is provided a feeding-in device preferably in the form of a screw.

In this heat exchanger a very effective contact is obtained between the cooled or heated fluid and the air or other gas, which is to be cooled or heated. Such contact is achieved by the cooled or heated fluid, which is projected out from the rotator, being braked in velocity, and then flowing back to the fluid present in the lowermost part of the housing, the cooled or respectively heated air at the same time escaping through the outlet opening of the housing. By means of said feed screw, the cooled or heated fluid is forced upwards into the channel by means of low pressure, whereby a more effective flushing of the cooled or heated fluid is obtained.

That part of the rotor shaft which extends upwards from and out of the housing may be provided with an inlet channel for fluid; the cooled or heated fluid need not then necessarily be situated at the bottom of the housing but may, by means of a pump, be extracted from a separate reservoir within which are provided conducts for a medium adapted to cool or heat the fluid. If the rotor is tapered outwards in direction towards its circumference, a better mixing of the cooled or heated fluid and the air or other gas to be treated is obtained.

Above the housing the rotator shaft is coupled to an electric motor for rotation of the shaft.

When the rotor is set in motion, the cooled or heated fluid rises upwards through the hollow shaft and is projected through the openings provided in the shaft wall into contact in atomized condition with the air or gas drawn in. The atomized fluid and the air at first are intimately intercontacted over a very large surface, within the rotor. Thereafter the air passes through a screen of fluid, because from the outer circumference of the rotator the fluid is thrown outwards against a guiding screen or wall. Here the fluid will again collect and return to the container in the lower portion of the housing, suitable leading and returning blades being provided for this purpose. The cooled or heated air leaves through the exit provided in the top portion of the housing, and is conducted to the space which is to be cooled or heated respectively.

From the top of the last mentioned space an insulated tube extends back to the rotor, so that the air contained in said space is returned, treated once more, and then led to said space.

The invention is further described in the following reference being made to the drawing, which shows a section through a preferred embodiment of the invention. The device comprises a housing 1 provided with a fluid inlet passage means 2. Within the lower part of the housing is provided an evaporator or heating coil 3, and fluid is admitted into housing 1 in such amount that it covers the coil. Within the top portion of the housing there is provided a rotor 5 having blades 6 and further an intake channel 7 for air or other gas, which is to be cooled or heated. At its top the rotor shaft 8 is connected with an electric motor (not shown). Within the shaft is provided a central channel 9 from which openings 10 provide communication with the hollow interior space of the rotor. At the lowermost part of the central channel in shaft 8 is provided a screw device 11 the blades of which function as a pump as the rotor shaft is turned so as to raise liquid from the pool 4 upwardly through the central passage in rotor shaft 8 and outwardly through the openings 10 in the shaft. Extending above and also radially exterior of the blade 6 of the rotor there is provided a conductor screen 12 provided with returning blades 13. When the rotor is rotated the air or other gas to be cooled or heated is drawn in through the channel 7, becomes mixed with the cooled (or heated) fluid, and is thereafter conducted to the outlet 15 after having passed through the openings 14.

The medium conducted through the coil 3 is supplied—when cooling is to take place—from a compressor plant provided with a condenser, the condensed medium entering the coil system either through A or B. For heating purposes the coil system may have superheated steam supplied thereto or electric or other suitable heating means may be made use of, according to the desired temperature to be obtained.

The heat exchanger of the invention, besides being suitable for usual cooling plants, is eminently suitable for the cooling down of hot gases, vapours, and the like; cooling liquids suitable for the different special purposes being used. By use of the present system it is also possible to recover or absorb different liquids having very low vaporising temperatures, e.g., trichlorethylene, whereby the same liquid is used as cooling liquid. If steam is to be cooled down in such manner that the cooling liquid absorbs the steam, an overflow valve must be provided, in order to maintain the liquid level at a maximum height within the bottom chamber.

The heat exchanger is above described specifically by a preferred embodiment which, however, may be modified without exceeding from the spirit of the invention. Moreover the heat exchanger may be used for other purposes than those specified above, as, for instance, the moistening of air.

I claim:

A heat exchanger, comprising in combination, a housing having bottom, top and side walls, said housing having an inlet and an outlet for gas the temperature of which is to be changed, said inlet and outlet being located in the upper portion of the housing, the lower portion of the housing being adapted to contain a pool of liquid, heat exchange means in the lower part of the housing and adapted to be at least partially immersed in the pool of liquid in the lower portion of the housing so as to change the temperature of said pool of liquid, a rotor mounted within the housing adjacent the top thereof, said rotor having a substantially vertical shaft on which the rotor is mounted to rotate therewith, said rotor being open at its center, said gas inlet communicating directly with the center of the rotor, the rotor being open at its rim and having a plurality of blades which extend generally radially from the rotor shaft, said rotor blades decreasing in height in the direction radially outwardly from the axis of the rotor, a sub-housing within the housing surrounding the rotor, the sub-housing having an upper portion which closely overlies the upper edges of the blades of the rotor, beyond the rim of the rotor the sub-housing being in the form of an annular screen which is spaced inwardly of the side walls of the housing, the screen extending markedly below the rotor, a plurality of fixed blades on the lower portion of the screen adapted to return liquid from the screen downwardly to the pool of liquid in the housing, the rotor having a generally horizontally extending substantially imperforate annular lower plate member affixed to the rotor blades and rotor shaft to rotate therewith, the outer rim of said lower plate being bent upwardly somewhat so as partially to overlie the outer ends of the rotor blades radially outwardly therebeyond and closely to confront the screen, the lower end of the rotor shaft being adapted to be immersed in the pool of liquid in the housing, the rotor shaft having a passage extending longitudinally therewithin from its lower end to a location within the rotor, the shaft having outlet openings therein extending between the channel in the shaft and the central portion of the rotor between the rotor blades, and impeller blades on the lower end of the rotor shaft extending inwardly from the wall of the passage in the shaft, said impeller blades functioning as a pump as the rotor shaft is turned, whereby to raise liquid from the pool upwardly through the passage in the shaft and thence outwardly through the outlet openings in the shaft into the center of the rotor.

References Cited by the Examiner
UNITED STATES PATENTS

| 2,176,174 | 10/1939 | Gelakoski | 165—60 X |
| 2,661,936 | 12/1953 | De Vilbiss | 62—310 X |

ROBERT A. O'LEARY, *Primary Examiner.*

FREDERICK L. MATTESON, JR., *Examiner.*

N. R. WILSON, *Assistant Examiner.*